(12) United States Patent
Wing et al.

(10) Patent No.: US 7,143,495 B2
(45) Date of Patent: Dec. 5, 2006

(54) BACKLIGHT ETCHING PROCESS

(76) Inventors: Brandon M. Wing, 15606 NE. 40th St., No. F224, Redmond, WA (US) 98052; Rick D. Wing, 13354 NE. 80th St., Redmond, WA (US) 98052

( * ) Notice: Subject to any disclaimer, the term of this patent is extended or adjusted under 35 U.S.C. 154(b) by 193 days.

(21) Appl. No.: 10/795,140

(22) Filed: Mar. 5, 2004

(65) Prior Publication Data

US 2005/0194347 A1 Sep. 8, 2005

(51) Int. Cl.
*B23P 25/00* (2006.01)
*G06K 9/00* (2006.01)
*H05B 33/10* (2006.01)
*G09F 13/04* (2006.01)

(52) U.S. Cl. .............. 29/458; 29/557; 29/558; 382/162; 382/171; 382/274; 382/282; 382/283; 345/626; 430/323; 216/4; 216/41; 216/52

(58) Field of Classification Search ........... 382/162, 382/169, 171, 261, 264, 266, 282, 283, 274; 29/557, 558, 458; 345/620, 621, 624, 625, 345/626; 430/323; 40/564, 541, 546; 216/4, 216/41, 52

See application file for complete search history.

(56) References Cited

U.S. PATENT DOCUMENTS

| | | | | |
|---|---|---|---|---|
| 3,163,554 A | * | 12/1964 | Gessler | .......... 40/443 |
| 4,012,257 A | * | 3/1977 | Geris | .......... 430/301 |
| 4,401,750 A | | 8/1983 | Goldberg | |
| 4,480,169 A | | 10/1984 | Macken | |
| 4,558,977 A | | 12/1985 | Inoue et al. | |
| 4,673,609 A | | 6/1987 | Hill | |
| 4,941,190 A | * | 7/1990 | Joyce | .......... 382/264 |
| 5,257,097 A | * | 10/1993 | Pineau et al. | .......... 358/500 |
| 5,432,684 A | | 7/1995 | Fye et al. | |
| 5,442,733 A | * | 8/1995 | Kaufman et al. | .......... 345/424 |
| 5,452,219 A | | 9/1995 | Dehoff et al. | |
| 5,456,955 A | | 10/1995 | Muggli | |
| 5,477,024 A | | 12/1995 | Share et al. | |
| 5,507,404 A | * | 4/1996 | Ryu | .......... 216/24 |
| 5,521,030 A | | 5/1996 | McGrew | |
| 5,543,103 A | | 8/1996 | Hogan et al. | |
| 5,640,254 A | * | 6/1997 | Sexton | .......... 258/536 |
| 5,723,843 A | | 3/1998 | Muggli | |
| 5,736,233 A | | 4/1998 | Fye | |
| 5,912,994 A | * | 6/1999 | Norton et al. | .......... 382/283 |
| 5,916,450 A | | 6/1999 | Muggli et al. | |
| 5,926,388 A | | 7/1999 | Kimbrough et al. | |

(Continued)

FOREIGN PATENT DOCUMENTS

FR 2702296 A3 * 9/1994

*Primary Examiner*—Essama Omgba
(74) *Attorney, Agent, or Firm*—Stratton Ballew PLLC (57) ABSTRACT

A backlight etching process, and more particularly the etching of a solid, semi-translucent base material, to form an exact image within the material. The base material is preferably translucent and most preferably an acrylic-based product, such as DuPont Corian®. Specific portions of the etched image can be digitally altered to enhance the quality of the image. Lines may be added to better delineate between areas of the image, or specific areas may be masked and altered. The etched image can also be colorized by cutting exact forms or silhouettes of colored film using digital techniques and adhering the silhouette to the smooth, back side of the etched image. A backing sheet may then be applied over the colored silhouette, to strengthen the product and protect the silhouette, to the etched image product.

11 Claims, 6 Drawing Sheets

U.S. PATENT DOCUMENTS

| | | |
|---|---|---|
| 5,943,801 A | 8/1999 | Wilkinson |
| 6,087,619 A | 7/2000 | Troitski et al. |
| 6,156,411 A | 12/2000 | Jennings |
| 6,174,065 B1 | 1/2001 | Schurch |
| 6,177,034 B1 | 1/2001 | Ferrone |
| RE37,186 E | 5/2001 | Hill |
| 6,254,791 B1 | 7/2001 | Boyd |
| 6,300,955 B1 * | 10/2001 | Zamir .................. 382/283 |
| 6,506,315 B1 * | 1/2003 | Ferro .................... 216/100 |
| 6,509,548 B1 * | 1/2003 | Troitski ............ 219/121.69 |
| 6,605,797 B1 * | 8/2003 | Troitski ............ 219/121.69 |
| 6,630,644 B1 * | 10/2003 | Troitski et al. ..... 219/121.69 |
| 6,791,716 B1 * | 9/2004 | Buhr et al. ............ 358/1.9 |
| 2002/0191857 A1 * | 12/2002 | Macy .................... 382/261 |
| 2003/0197716 A1 * | 10/2003 | Krueger ................ 345/629 |
| 2003/0223082 A1 * | 12/2003 | Trantow et al. .......... 356/601 |
| 2003/0234871 A1 * | 12/2003 | Squilla et al. .......... 348/220.1 |
| 2004/0012679 A1 * | 1/2004 | Fan .................... 348/207.99 |
| 2004/0222987 A1 * | 11/2004 | Chang et al. .............. 345/419 |
| 2004/0240741 A1 * | 12/2004 | Aliaga et al. ............. 382/232 |

* cited by examiner

BACKLIGHT ETCHING PROCESS

TECHNICAL FIELD

The invention relates to a process and apparatus for a backlight etching process, and more particularly to an etching of a solid, semi-translucent material, to form an exact image within the material. The etched image can be digitally altered to enhance the quality of the image, and alternatively can be colorized, or thermoformed to change the shape of the etched image.

BACKGROUND OF THE INVENTION

Semi-translucent surface materials can be etched to form images within the material. One such material is Corian®, an acrylic-based product manufactured by DuPont®. The etching can be derived from a scanned photographic image, which is reproduced into the solid material with an etching process that utilizes precision milling equipment. The milling equipment is programmed to create an image in the solid material. Lighter areas of the image are cut the deepest into the material. The resultant image is well suited to illumination through a back-light. However, the sharpness and resolution of the etched image is often compromised by the digital translation of the scanned image to the etching. A process is needed that better reproduces the photographic quality image in exact detail, without undue experimentation.

DETAILED DESCRIPTION OF SPECIFIC EMBODIMENTS

The invention provides a backlight etching process that mills a solid, translucent material to form an exact image within the material. An etched image 10 in an etched product 11, is illustrated in FIGS. 1 through 6C, as produced with the process of the invention 20, summarized in FIGS. 7A through 8.

Figure 1A:
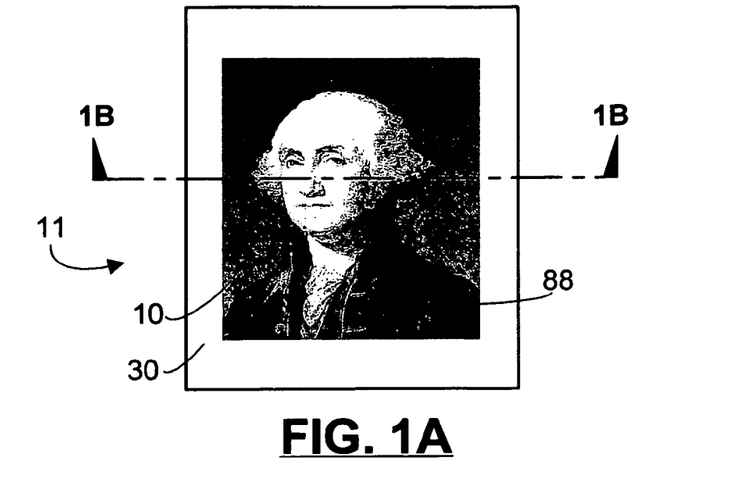
FIG. 1A is a plan view of a backlight etching, according to an embodiment of the invention.
Figure 1B:
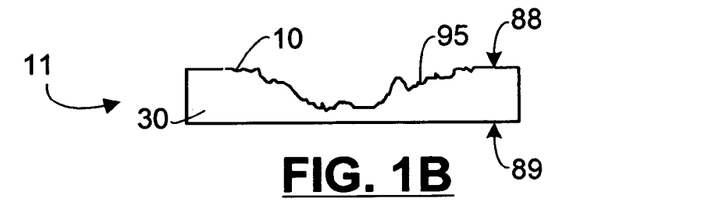
FIG. 1B is a sectioned view of a backlight etching, taken along section line 1B—1B of FIG. 1A, according to an embodiment of the invention.
Figure 2:
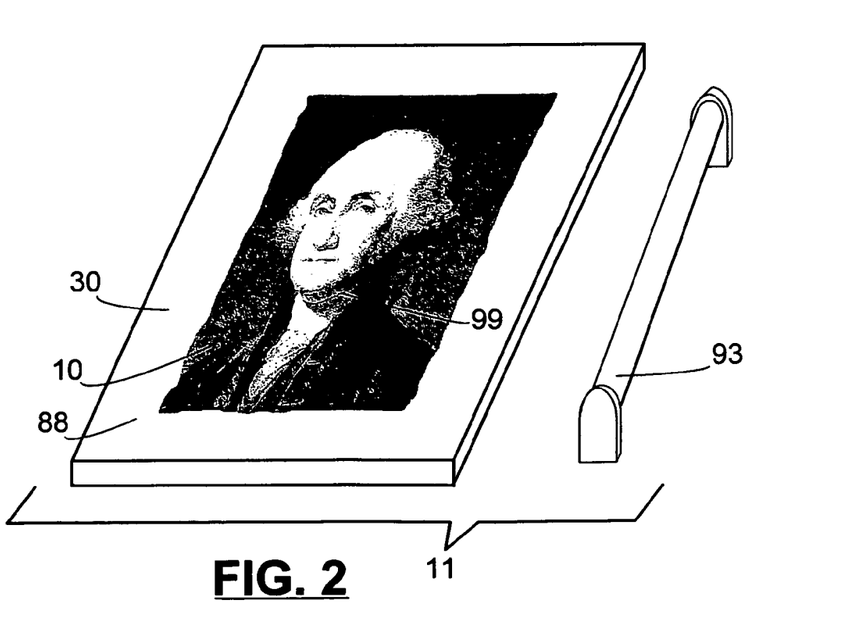
FIG. 2 is a perspective view of a backlight etching, according to an embodiment of the invention.

As detailed in FIGS. 1A, 1B and 2, the process of the present invention begins with a sheet, or block, of a base material 30. The base material is preferably translucent and most preferably an acrylic-based product. Corian®, which is manufactured by DuPont®, of Wilmington Del., USA, is a most preferred base material. However, as an alternative to the most preferred base material, any solid and homogeneous acrylic, or acrylic based material may be utilized for the present invention. Ideally, the base material has a transmittance that varies linearly as a function of material thickness from a range of near 100% at minimum material thickness and near 0% at maximum material thickness. For Corian®, this range is approximately, 1/32 of an inch for the minimum, and 1/4 of and inch for a preferred maximum. These light transmission ranges are approximate because they depend on the specific color and light transmission qualities of the Corian® selected, and also the range of transmission densities or thicknesses required for a particular work. For quantifying light transmission, ASTM D1003 is employed by the industry. ASTM D1003 defines "luminous transmittance," referred to herein as transmittance, as the percentage of incident light transmitted through a particular specimen.

The base material 30 must have the ability to be milled or machine etched, with a router or mill, without chipping, shattering, melting or flaking. As discussed above, for a most preferred embodiment of the present invention, the base material is a 1/4 inch to 1/2 inch thick Corian® "solid surface material." The base material may be referred to as a "blank" that is preferably precut to size and shape to the final product size. For ease of handling and processing, the base material may be left in an uncut or rough size, which can later be trimmed to the final size, as desired.

Figure 3:
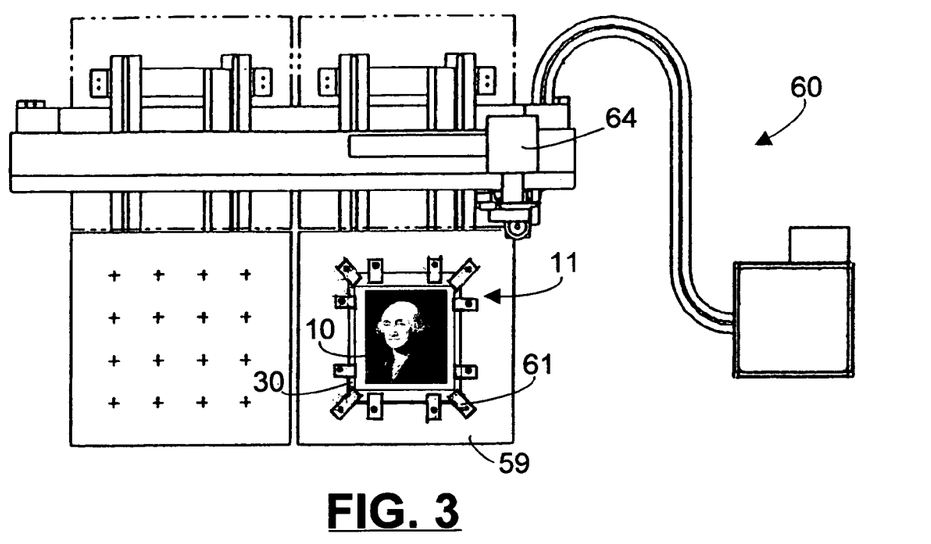
FIG. 3 is a top view of a backlight etching and mill, according to an embodiment of the invention.
Figure 4:
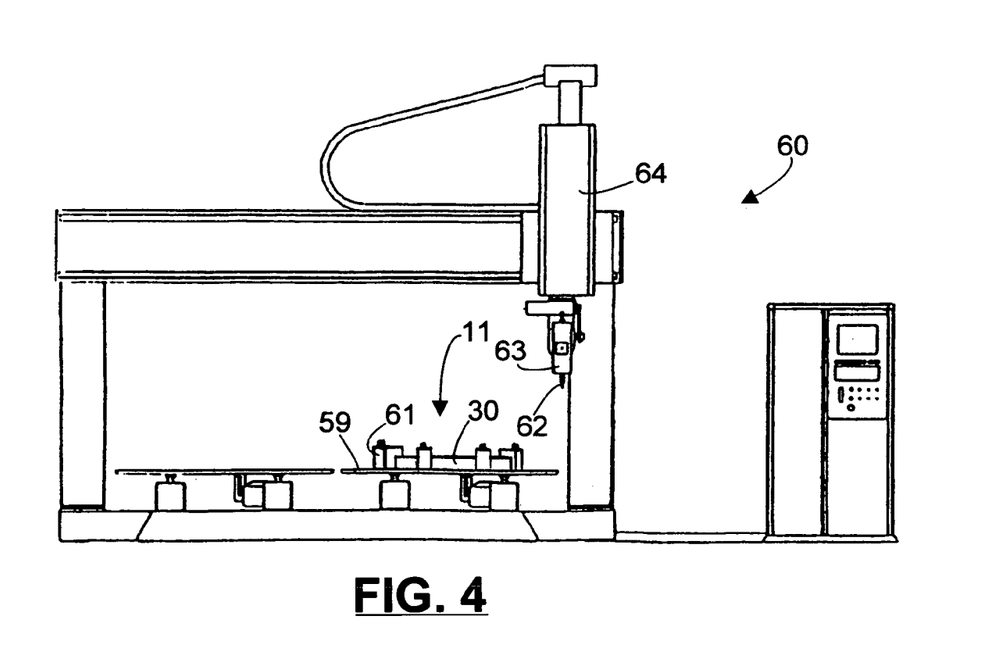
FIG. 4 is a side view of a backlight etching and mill, according to an embodiment of the invention.

The blank, or base material 30, is preferably mounted to a table 59, which is the working surface of a conventional "computerized numeric control" or CNC mill 60, as shown in FIGS. 3 and 4. This mounting may be with "dogs" 61, as shown, or alternatively with adhesives or a vacuum table system, as is known in the art of milling. For the present invention, the photorealistic image 70 is translated from the photorealistic image 69. The digitized image is cut or etched into the solid, base material with the CNC mill. The precision, CNC mill is a conventional milling system, able to reproduce the three dimensional, or "3-D" image in the base material. The CNC mill includes a cutter 62 and a spindle 63, mounted on a machine access 64, as shown in FIG. 4. Most preferably the CNC mill is a 5-axis router mill, such as a "model 67," as manufactured by Thermwood, of Dale Ind., USA.

The CNC mill 60 preferably utilizes "fixturing," a term known to persons skilled in CNC milling. Fixturing holds the base material 30 on the table in proper orientation to the milling machine, preferably flat and parallel to the table surface, and exactly perpendicular to the CNC cutter 62 and spindle 63.

Figure 7A:
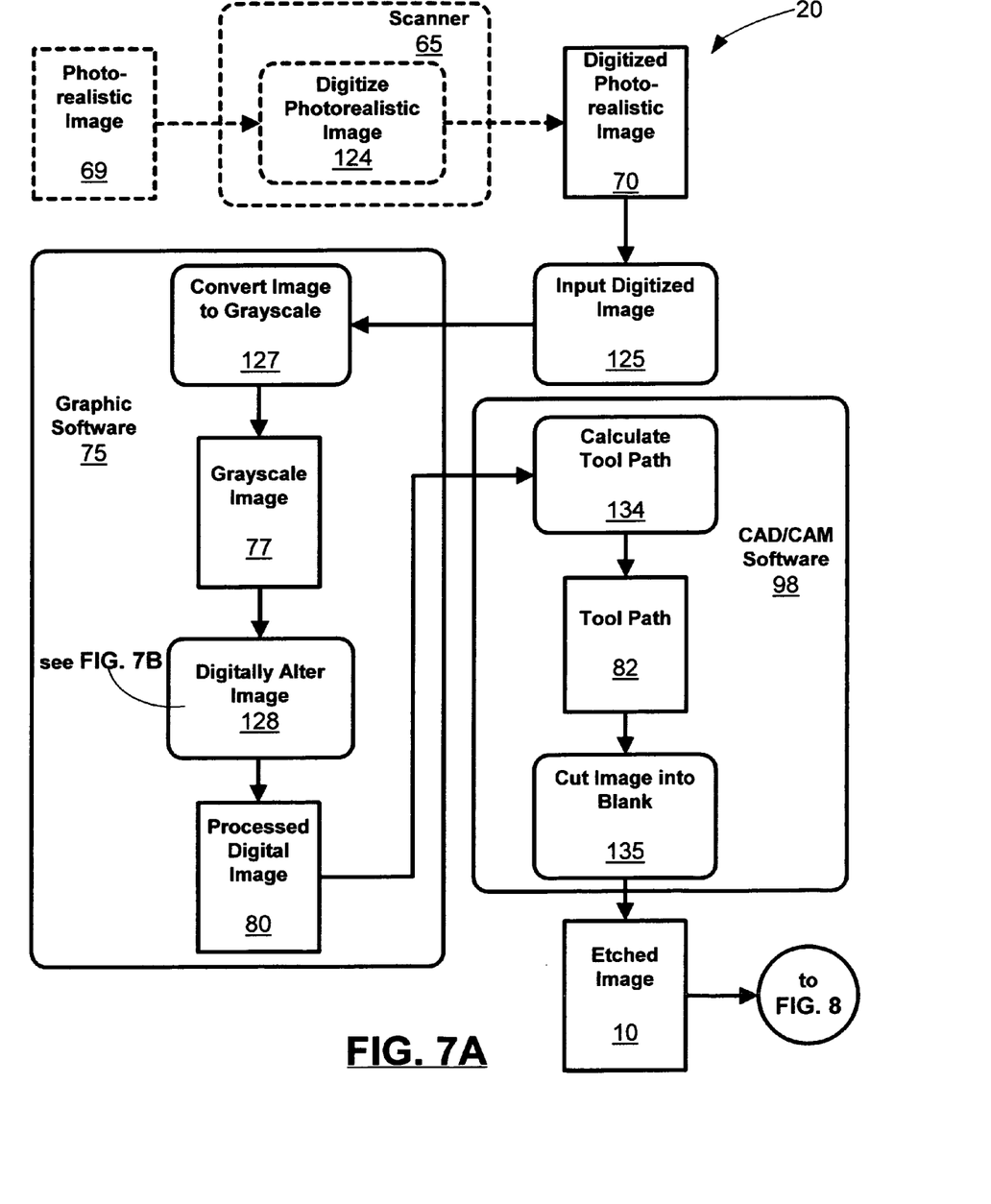
FIG. 7A is a schematic diagram of a backlight etching process, according to an embodiment of the invention.

A preferred process of the invention is shown in FIG. 7A. For this preferred process, the base material 30 receives the etched image 10. The etched image is preferably derived from a photorealistic image. Optionally, a conventional scanner 65 is utilized to "digitize the photorealistic image" 124. For this option, which is a most preferable embodiment, the scanner is a high resolution flatbed scanner. The scanner acquires the photorealistic image from a source photograph, drawing, painting, rendering or any substantially two dimensional object, converting the photorealistic image to a digitized photorealistic image 70. As preferred alternative to the option of scanning of the photorealistic image, a digital photograph, digital image or print ready graphical artwork, as typically provided by a client, can be utilized to generate the photorealistic image. Any conventional method or format of digital information transfer could be utilized, including e-mail, or from archival storage on a computer disc or compact disc. Alternatively, the digitized photorealistic image can be generated by a digital camera, eliminating the need for scanning or digitizing an analog image.

The use of the photorealistic image 69 is significant for the present invention. The photorealistic image may be any image that is of a high resolution, typically found in conventional photographs. Prior attempts in the industry to reproduce high resolution etched, backlight images with a photographic quality, required extensive "smoothing" or loss of resolution, resulting in a greatly softened or "fuzzy" image. Additionally, these prior art etched images required extensive experimentation and testing with each specific image to arrive at the proper density settings for a particular material used as the base material 30. Brightness and contrast issues for each image had to be resolved with test runs in expensive base materials that had to be discarded.

Figure 5A:
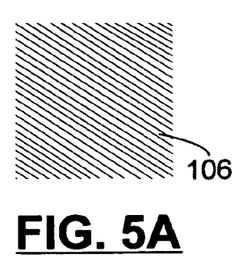
FIG. 5A is a sheet of color film, according to an embodiment of the invention.

For the present invention, a graphic software program 75 is employed to process the digitized photorealistic image 70. Most preferably, the graphic software program is conventional photo processing program, such as Adobe Photoshop™, which executes on a conventional personal computer (PC). Many similar programs are available for and could be employed satisfactorily in the present invention. An initial step of the process of the present invention includes an "input of the digitized photorealistic image" 125 into the graphic software, as shown schematically in FIG. 5.

The digitized photorealistic image 70, in its initial, digitized form, is typically unsatisfactory for use in generating the etched image 10. Since the base material 30 is preferably homogeneous and monochrome, in a preferred embodiment, the color information of the digitized photorealistic image is best removed and replaced with a grayscale image 77, which is essentially a mono-chromatic image. The graphic software program 75 is again employed to "convert the digitized photorealistic image to a grayscale image" 127.

The grayscale image 77, as a high resolution image, is still unsatisfactory for use in generating the etched image 10. Because of resolution and response limitations, the CNC mill 60 cannot exactly reproduce high resolution images. Therefore, the digitized photorealistic image 70 is preferably processed through "digitally altering the image" 128. Again, the graphic software program 75 is employed.

Figure 7B:
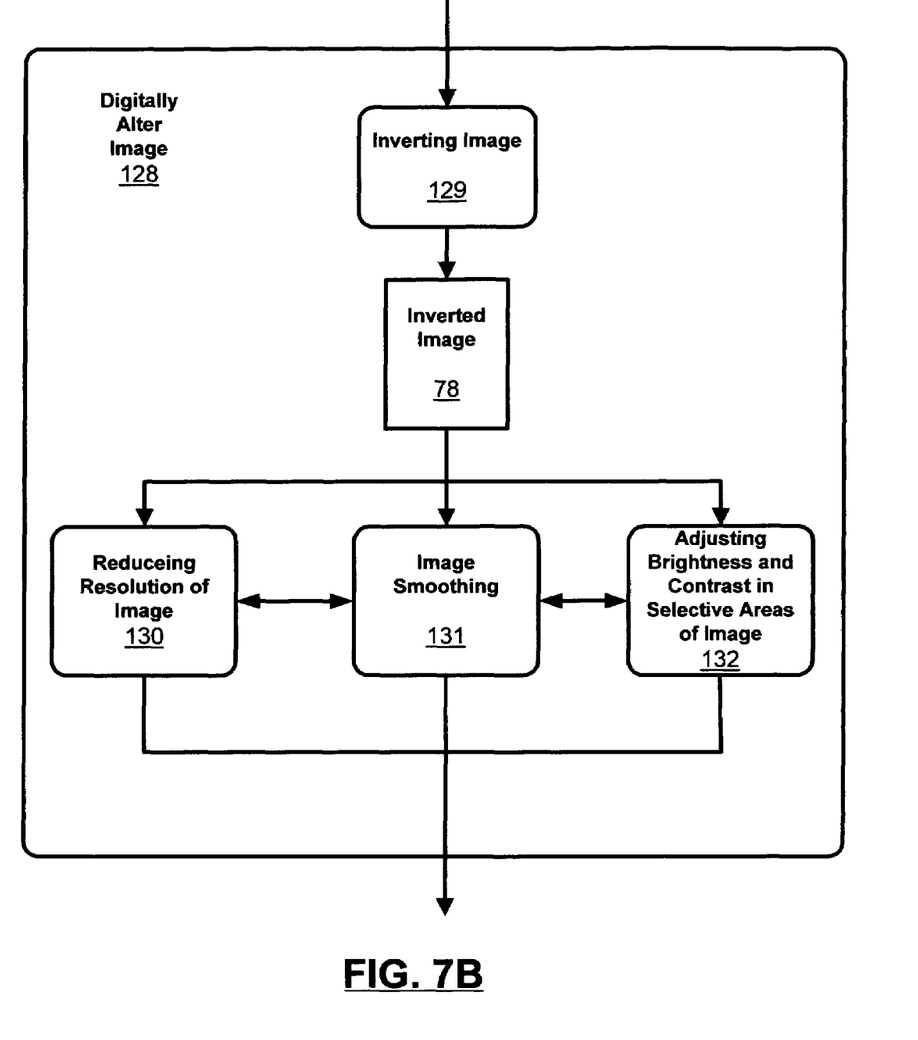
FIG. 7B is a schematic diagram of a backlight etching process, according to an embodiment of the invention.

FIG. 7B details this digitally altering process for a preferred embodiment for the present invention. These specific operations are optional, and only necessary to improve the quality of the etched image 10. These steps can be performed in any order, but preferably the image is first processed by "inverting the image" 129. This provides an inverted image 78, which is essentially a mirrored negative of the desired image. This inversion process step is performed so that the etched image appears correctly when reversed and illuminated, as discussed further herein.

As also shown in FIG. 7B, manipulation of the actual digitized photorealistic image 70 can begin by "reducing resolution of the image" 130. Typically, the digitized photorealistic image will have a resolution greater than the capabilities of the CNC mill 60, in that a high resolution image will require extremely long period to reproduce into the base material 30, with only a slight improvement in the quality of the etched image 10. Most often, the digitized photorealistic image will have an initial resolution of 300 to 600 dpi, which is then reduced. An optimal final resolution of approximately 133 dpi is considered ideal, with a range of 100 to 167 dpi, preferred.

The digitized photorealistic image 70, preferably converted to the grayscale image 77, can be further enhanced by smoothing the image 131. Smoothing is a conventional technique of typical graphic software 75. Smoothing digitally introduces a slight "fuzziness" to an image, reducing gradients in image intensity, between adjacent pixels. "Despeckling" is another smoothing technique, commonly available in typical graphic software, to remove graininess. "Sharpening," another common software tool that aids in the distinction between areas in the image. Sharpening can be employed with the above described softening techniques, and in combination gives the etched image 10 a soft quality that still presents a defined image, but is less demanding on the CNC mill 60, as compared to the un-processed, raw digitized photorealistic image.

Additionally, specific and selected area of the digitized photorealistic image 70 can be altered, again preferably after converting the image to grayscale 127. In an important step in digitally altering the image 128, "adjusting brightness and contrast in selected area of the image" 132 can significantly enhance the resultant etched image 10. Areas of the digitized photorealistic image may be too light, too dark, or lack sufficient focus or detail for optimal reproduction in the etched image. Specific areas of the digitized photorealistic image can be "masked" and then "enhanced," all with the aid of the graphic software 75, to improve these areas in the final, etched image.

Furthermore, areas of the digitized photorealistic image 70 can be delineated from adjacent areas by the addition of a separation line 99. One such line is shown in FIG. 2, to accentuate the neckline of the etched image 10. Any area of similar density can be separated by such separation line.

Preferably, the optional, digitally altering 128 step is performed after the grayscale image 77 is generated. As an alternative, this step can be performed prior to the conversion. Converting the image to grayscale 127 with digitally alteration, as discussed above, transforms the digitized photorealistic image 70 into a processed digital image 80. As an alternative to first converting the image to grayscale and then further altering, the digitized photorealistic image can first be digitally altered and then converted to grayscale. This option is preferable in some instances, where maintaining color information in the digitized image during image processing is helpful or desired.

As shown in FIG. 7A, the processed digital image 80 is now converted into a "tool path" 82, for instructing the CNC mill 60, to accurately reproduce the image, and form for the etched image 10. The tool path is actual path or route the cutter 62 of the mill will follow on the base material 30. The CNC mill includes a "CAD/CAM" software 85, which performs a "computer aided drafting," and "computer aided machining" combination of tasks to perform the necessary translation specific for the given mill or router. The CAD/CAM software "calculates the tool path" 134. This processing changes or translates the digital image from a graphical, "raster" type of file, readable by a personal computer, to a machine language file, readable by the CNC mill. This conversion includes using the translucence, as indexed to the specific, selected base material 30, or blank, the density gradients of the two-dimensional processed digital image is essentially translated into a three-dimensional thickness gradient in the base material. Lighter areas of the etched image are cut the deepest into the base material. After calculating the tool path, the etched image is "cut into the blank" 135.

The etched product 11 has a front side 88 and a back side 89. The front side preferably includes the cut image 10, and the back side is smooth, not cut by the process of the invention 20. Alternatively, the smooth, back side could be faced outward to a viewer of the etched image. However, for clarity of the etched image and a three-dimensional effect, the front side is preferably faced to the viewer.

The etched image 10 is well suited to illumination through a "backlight." The backlight is a source of light, from either a natural or artificial source, directed through a back side 89 of the base material 30, to illuminate the etched image. The graphic software program 75 reproduces the photographic image 69 in substantially exact detail. Once illuminated, the contrast between light and dark areas within the base material, as defined by the thickness of the material in the cut image, produces the features of the image.

The milling process of the present invention cuts the 3-D, digitized photorealistic image 70 into the base material 30. This milling process can create an image of photographic quality within the base material. The process includes the forming of an "image gradient" 95 with the material. The image gradient is produced by precisely varying the thickness of the base material. An exact, 3-D rendering in the flat translucent, base material suitable for backlighting, is derived from the two-dimensional, scanned object.

Programming the digitized photorealistic image 70 into the CNC mill 60 is a critical step in the present invention. For a preferred embodiment of the present invention, once the photorealistic image is loaded into a graphic utility 90, which is typically included in the graphic software program 75, and widely available for such uses. Again, a preferred graphic utility is included in Adobe Photoshop™. The photographic image is adjusted, modified, corrected or generally improved to enhance the visual effectiveness of the image, generating the enhanced or processed digital image 80. The criteria for the enhanced photorealistic image includes that it best reproduces the photographic image into the base material 30.

The processed digital image 80 is loaded into a "computer-aided design and computer aided manufacturing" or CAD/CAM software 98, to develop the tool path 82, which is required to create the image gradient 95. The image gradient contrasts areas of light and dark into the base material 30, as constrained by the limits of the CNC mill 60. The exact translation of the enhanced photorealistic image into the CAD/CAM program is uniquely modified for the present invention by use of a "high resolution smoothing," which is typically another element of the graphic utility 90. High resolution smoothing is a technique available in most graphic utilities but prior to the present invention not employed for actual milling technologies as employed in the cutting of images into plastic materials.

Once the processed digital image 80 is processed in the CAD/CAM software 98 and the tool path 82 instruction is generated, the tool path is post-processed to be read into the CNC machine 60. The CNC machine includes the needed software program to accept, process and execute the tool path instruction, translating the enhanced photorealistic image into the etched image 10. For fabrication of the etched image, the tool path instruction loaded into the CNC mill 60 drives the spindle 63 and manipulates the CNC mill, to utilize various sized cutting bits, as known to persons skilled in the art of precision CNC milling, so that the cutter 62 can machine away the thickness of the base material 30 to varying desired thicknesses.

Because the completed, etched product 11 has thick and thin areas, as shown in FIG. 1B, the etched product may require reinforcing, or some other similar protection. A reinforcing sheet 104 is preferably employed for this purpose. Utilizing a high bond adhesive, sheets of a suitable thicknesses of clear acrylic, tempered glass, or Corian® are bonded to the back 89, or smooth side of the etched product, as shown in FIGS. 6B and 6C. When clear acrylic is employed, it is sanded, de-burred and preferably flame polished to enhance the beauty of the etched image 10.

Figure 6A:
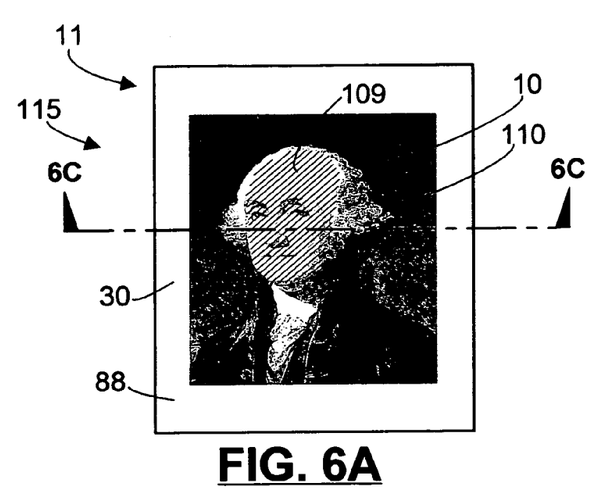
FIG. 6A is a plan view of a colorized backlight etching, according to an embodiment of the invention.
Figure 6B:
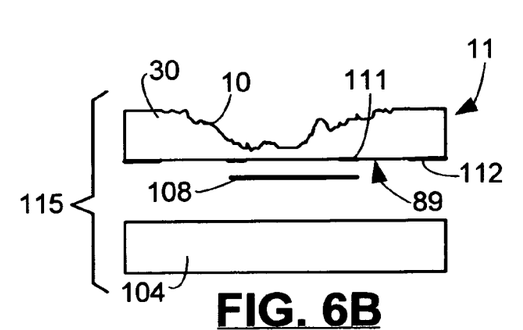
FIG. 6B is an exploded sectioned view of a colorized backlight etching, according to an embodiment of the invention.
Figure 6C:
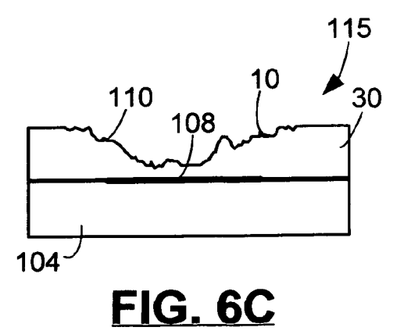
FIG. 6C is a sectioned view of a backlight etching, taken along section line 6C—6C of FIG. 6A, according to an embodiment of the invention.
Figure 8:
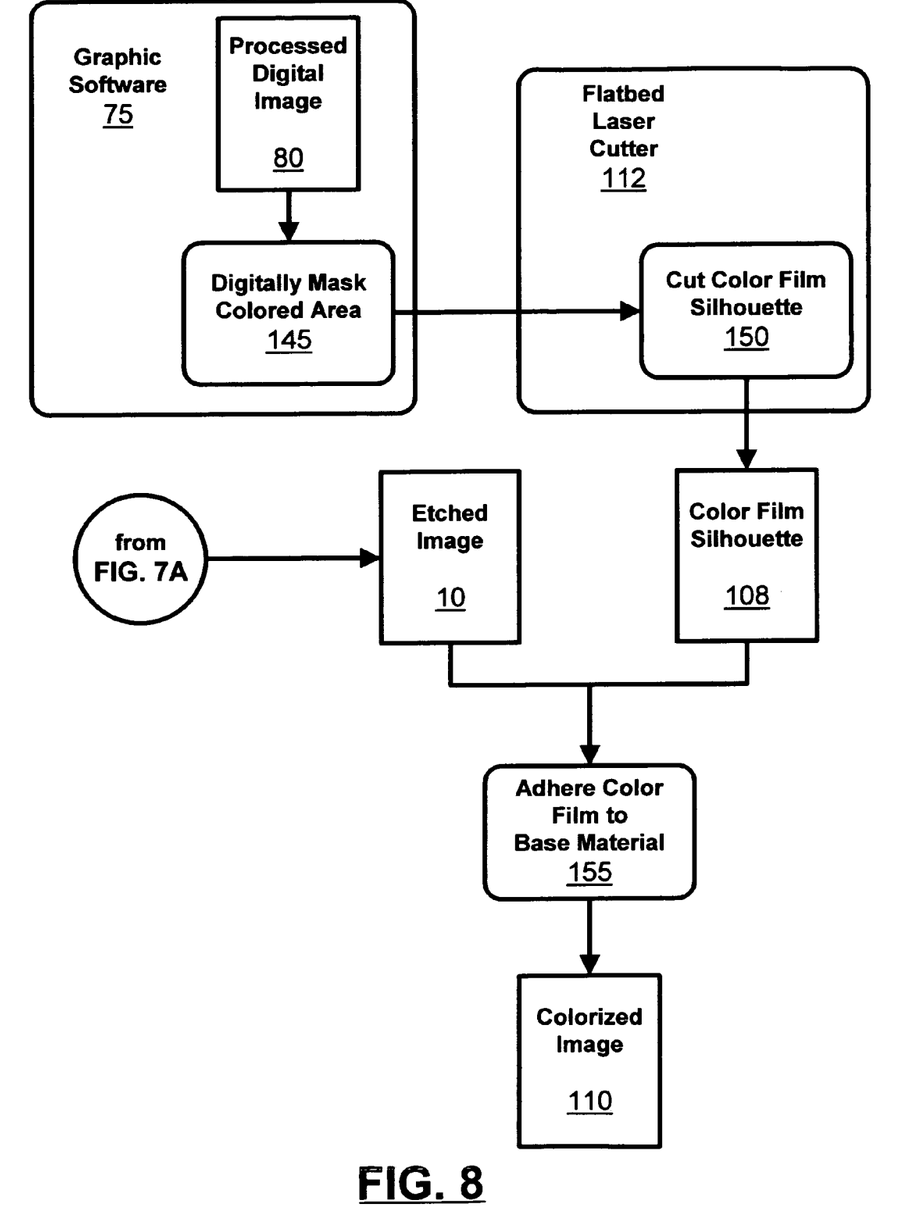
FIG. 8 is a schematic diagram of a backlight etching process, according to an embodiment of the invention.

As shown in FIG. 6A, a preferred embodiment of the present invention includes colorizing the etched image 10 with a colored film 106, to produce a colorized image 110. A preferred colored film for this purpose are the polycarbonate or polyester films sold under the names of Roscolux™ or Supergel™, manufactured by Rosco Laboratories of Stamford Conn., U.S.A. However, it is considered that any colored film product, reasonably durable and resistant to fading could be employed. A preferred process for the use of colored film in colorizing the etched image is shown in FIG. 8. Any desired, various color of the colored film, typically having a thickness of approximately 2 mils (0.002 inches), up to approximately 5 mils can be employed. The thickness of the material employed can be increased or decreased depending upon the desire effect and the ease of application needed. Thicker films are typically more durable and easier to apply. However, thinner films add a lighter color effect. The film is cut out to match the area to be colorized exactly.

Most preferably, a conventional, light industrial flatbed "$CO_2$" type of laser cutter 112 is employed to cut the raw sheet of the colored film 106 in the desired outside shape or color film "silhouette" 108. The layout of the color film silhouette is generated in the processing with the graphic software 75. Employing conventional graphic utilities included in typical graphic software suites or packages, the operation and use of which is well known to those skilled in the art of computer-aided graphic design, specific colored areas of the photographic image are identified and "masked" 145. This masking designates specific and discrete areas of the processed digital image 80 as a "colorized zone" 109, as shown in FIG. 6A. The colorized zone is an area or group of areas of the etched image 11, in which a change of color is desired.

Figure 5B:
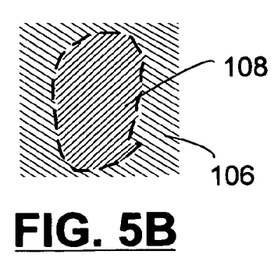
FIG. 5B is a sheet of color film, according to an embodiment of the invention.
Figure 5C:
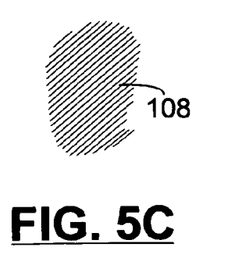
FIG. 5C is a silhouette of color film, according to an embodiment of the invention.

For colorizing, this embodiment of the present invention employs the completed, etched image 10, as shown in FIG. 2. With the photographic program, the colorized zones 109 of the image are mapped onto the colored film as shown in FIG. 5B, and the flatbed $CO_2$ laser cutter 112 employed to generate the silhouette 108. The laser cuts the color film silhouette 150, as shown in FIG. 5C, which is then combined with the base material 30 of the etched image, to form the colorized image 110. The color film silhouette is adhered to the base material 155.

In a less preferred embodiment, the silhouette 108 may be formed by a manual tracing of the etched image 11. This typically produces an inferior silhouette, as compared to the exactly formed, laser cut shape, but is adequate for colorized zones 109 having smooth contours. This manual alternative is also adequate for colorized zones that are small.

As shown in FIGS. 6B and 6C, the silhouette 108 is bonded to the specific area of the image to be colorized or changed on the back side 89 of the base material 30, preferably with a clear high bond adhesive 111. A doublesided tape 112, preferably clear and "anaerobic," as is typically used for bonding sheet plastics is then employed to bond the reinforcing sheet 104 to the back side of the base material, forming a colorized product 115.

In an alternative embodiment of the present invention, colorized zones 109 of the base material 30 can be removed and replaced with an alternative color prior, to milling the cut image with the CNC mill 60. Those colorized zones, as identified for an alternative color are programmed in the CAD/CAM software 98, and during the CNC machining process, are cut out of the alternative material as a "male interlock." The area in the image to be replaced with the alternative color "female interlock" is removed with the CNC mill 60 in the main body of the image, precisely the same size as the male interlock piece. Preferably, the male interlock is bonded into the female interlock with an adhesive. Most preferably, a color matched solid surface adhesive is used, such as a Corian® colored adhesive.

Once bonded and cured, the final etched product 11 is processed as is the solid, homogeneous base material 30, with the colorized zones milled to the specific thickness or image gradient 95, as programed and executed by the CNC mill 60. After etching, The colorized image 100 can be "backed by a reinforcing sheet" 165, the reinforcing sheet 104 described above, to form the colorized product 115.

In an additional embodiment of the present invention the etched image 10 may be altered by thermoforming. Utilizing a conventional thermoforming oven, the completed, etched product 11 is heated to approximately 350 degrees F. The exact temperature depends on factors such as the manufacturer's reported melting characteristics of the base material used, the depth of the cut image or gradient, as formed into the base material, and the formulation of the base material 30. Preferably employing covered forming mold, most preferably a flannel cloth covered forming mold, the heated cut image is draped over the forming mold. A top assist tool or alternatively a vacuum system, as well known in the art of thermoforming, are now employed to draw down the heated cut image on the duplicate forming mold. A duplicate image is formed that is an exact copy of the cut image. The formed duplicate image is allowed to cool and retain the new thermoformed shape. Thermoformed or contoured surfaces may be, but are not limited to, arcs, compound curves, sweeps, radii, bent, twisted, angled, or various other conventional shapes.

To reinforce the thermoformed images, the reinforcing sheet 104 is laminated to the etched product 11. Preferably, the reinforcing sheet is produced to the same overall, outside dimension as the etched product. Alternatively, utilizing the same forming mold that the image was produced with, a clear acrylic reinforcing sheet is produced to the same overall, outside dimension as the etched product. This clear acrylic reinforcing back, which most perfectly matches the backside of the completed formed image, is bonded to the back side 89, or smooth side, again preferably with the clear, high bond adhesive 111, or alternatively the double backed adhesive tape 112.

In compliance with the statutes, the invention has been described in language more or less specific as to structural features and process steps. While this invention is susceptible to embodiment in different forms, the specification illustrates preferred embodiments of the invention with the understanding that the present disclosure is to be considered an exemplification of the principles of the invention, and the disclosure is not intended to limit the invention to the particular embodiments described. Those with ordinary skill in the art will appreciate that other embodiments and variations of the invention are possible, which employ the same inventive concepts as described above. Therefore, the invention is not to be limited except by the following claims, as appropriately interpreted in accordance with the doctrine of equivalents.

The invention claimed is:

1. A process for etching an image of photographic quality within a translucent material, the process comprising the steps of:
   a) acquiring a digitized image;
   b) digitally masking a selected area of the digitized image, the selected area less than the total digitized image;
   c) digitally enhancing the selected area of the digitized image to form a processed digitized image;
   d) digitally translating a tool path from the enhanced digitized image; and
   e) cutting an etched image into the translucent material with a mill tool, the mill tool under computer control, and the mill tool programed to follow the tool path.

2. The process of claim 1, wherein the step of digitally enhancing the selected area of the digitized image additionally includes the step of:
   c2) adjusting a brightness in a selected area of the digitized image, to enhance the etched image.

3. The process of claim 1, wherein the step of digitally enhancing the selected area of the digitized image additionally includes the step of:
   c2) adjusting a contrast in a selected area of the digitized image, to enhance the etched image.

4. The process of claim 1, wherein the step of digitally enhancing the selected area of the digitized image additionally includes the step of:
   c2) adding a separation line to the digitized image, to delineate an area of the digitized image from an adjacent area of similar density.

5. The process of claim 1, wherein the step of digitally enhancing the selected area of the digitized image additionally includes the step of:
   c2) reducing the resolution of the digitized image to approximately 133 dpi.

6. The process of claim 1, where the digitized image is a colored image, and wherein the step of digitally enhancing the selected area of the digitized image additionally includes the step of:
   c2) converting the color image to a grayscale image.

7. The process of claim 1, wherein the step of digitally enhancing the selected area of the digitized image additionally includes the step of:
   c2) reversing the digitized image.

8. The process of claim 1, wherein the etched product has a front side and a back side, the front side including an image gradient and the back side having a smooth surface, and the additionally includes the step of:
   f) backing the smooth surface of the back side of the etched product with a second sheet of translucent material.

9. The process of claim 1, additionally including the step of:
   f) illuminating the colorized etched image with a backlight.

10. A process for etching an image of photographic quality within a translucent material, wherein the etched product has a front side and a back side, the front side including an image gradient and the back side having a smooth surface, including the steps of:
   a) translating a tool path from a digitized image;
   b) cutting an etched image into the translucent material with a mill tool to form an etched product, the mill tool under computer control, and the mill tool programed to follow the tool path;

c) cutting a silhouette from a colored film with a cutter, the cutter under computer control;

d) adhering the silhouette to the etched product to form a colorized image; and e) adhering the silhouette to the smooth surface of the back side of the etched product.

11. The process of claim 10, additionally including the step of:

f) barking the smooth surface of the back side of the etched product with a second sheet of translucent material.

* * * * *